(12) United States Patent
Wang et al.

(10) Patent No.: US 12,097,865 B2
(45) Date of Patent: Sep. 24, 2024

(54) METHODS AND APPARATUS FOR PROVIDING STATE ESTIMATION IN AUTONOMOUS VEHICLES

(71) Applicant: Nuro, Inc., Mountain View, CA (US)

(72) Inventors: Yin Wang, Fremont, CA (US); Paul Michael White, Mountain View, CA (US); Matthew Jeremy Sarett, San Francisco, CA (US); William Campbell Martin, Redwood City, CA (US)

(73) Assignee: NURO, INC., Mountain View, CA (US)

( * ) Notice: Subject to any disclaimer, the term of this patent is extended or adjusted under 35 U.S.C. 154(b) by 425 days.

(21) Appl. No.: 17/478,339

(22) Filed: Sep. 17, 2021

(65) Prior Publication Data

US 2022/0089167 A1    Mar. 24, 2022

Related U.S. Application Data

(60) Provisional application No. 63/082,876, filed on Sep. 24, 2020.

(51) Int. Cl.
| | | |
|---|---|---|
| *B60W 50/00* | (2006.01) | |
| *B60W 60/00* | (2020.01) | |
| *G06F 1/14* | (2006.01) | |
| *H04L 12/40* | (2006.01) | |

(52) U.S. Cl.
CPC .......... *B60W 50/00* (2013.01); *B60W 60/001* (2020.02); *G06F 1/14* (2013.01); *H04L 12/40* (2013.01); *B60W 2050/0043* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 2009/0190571 A1* | 7/2009 | Kitz | ............... | H04L 12/4135 370/350 |
| 2014/0350768 A1* | 11/2014 | Filippov | ........... | B60W 60/0053 701/23 |
| 2015/0003443 A1* | 1/2015 | Koenigseder | ......... | H04W 40/20 370/350 |

* cited by examiner

*Primary Examiner* — Peter D Nolan
*Assistant Examiner* — Jacob Kent Besteman-Street
(74) *Attorney, Agent, or Firm* — Edell, Shapiro & Finnan, LLC

(57) ABSTRACT

According to one aspect, a method includes obtaining, at a first unit, a first signal, and storing an indication of an arrival time of the first signal in a register of the first unit. The method also includes obtaining a digital signal to be provided to a controller area network (CAN) circuit system, the CAN circuit system being included in the first unit, adding the indication to the digital signal, wherein adding the indication to the digital signal creates an updated digital signal, and providing the updated digital signal to the CAN circuit system.

20 Claims, 11 Drawing Sheets

METHODS AND APPARATUS FOR PROVIDING STATE ESTIMATION IN AUTONOMOUS VEHICLES

PRIORITY CLAIM

This patent application claims the benefit of priority under 35 U.S.C. § 119 to U.S. Provisional Patent Application No. 63/082,876, filed Sep. 24, 2020 and entitled "METHODS AND APPARATUS FOR PROVIDING TIME SYNCHRONIZATION," which is incorporated herein by reference in its entirety.

TECHNICAL FIELD

The disclosure relates to providing systems suitable for use in autonomous vehicle systems. More particularly, the disclosure relates to providing time synchronization between a vehicle control unit and a motor control unit of an autonomous vehicle system.

BACKGROUND

In order for an autonomous vehicle to operate safely and reliably, the ability for systems associated with the autonomous vehicle to be synchronized to substantially ensure coordinated operation is often critical. When autonomous vehicle systems which are expected to engage in coordinated operation are affected by latency, as for example due to time delays associated with sending and receiving signals, the safety and reliability with which an autonomous vehicle may operate may be compromised.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
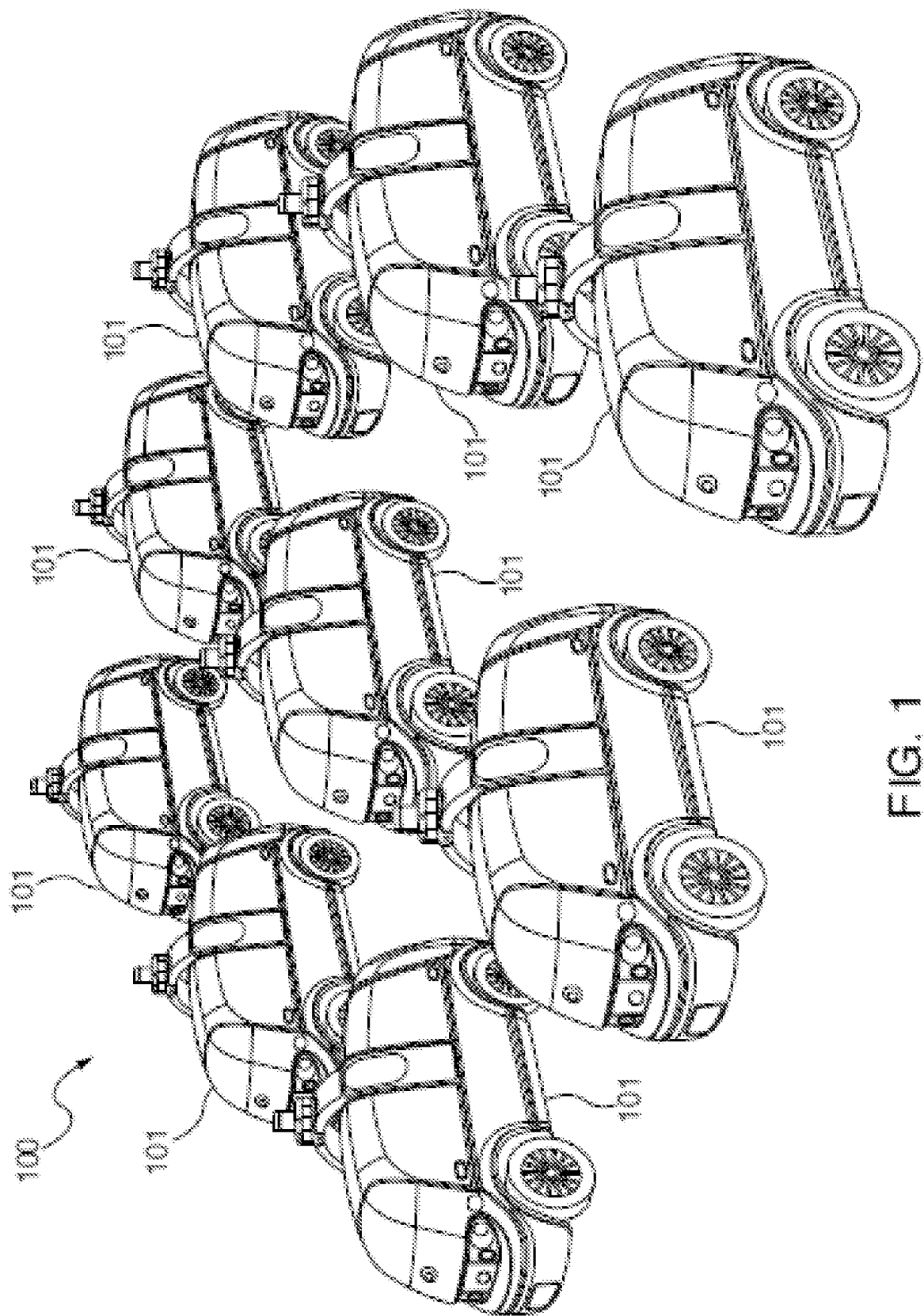
FIG. 1 is a diagrammatic representation of an autonomous vehicle fleet in accordance with an embodiment.

To reduce latency issues associated with the operation of a central control unit and a local control unit of an autonomous vehicle, a timestamp may be provided to facilitate synchronization within systems of the autonomous vehicle. A central control unit may send a signal as a time synchronization signal to a local control unit. A counter local to the local control unit may be substantially reset upon receiving a rising edge of the signal. When the local control unit collects information to be provided to the central control unit, the local control unit may process the information and also add a timestamp to the information based on the counter. The information and the timestamp may then be transmitted to the central control unit through any suitable communication channel.

In accordance with an embodiment, a method includes obtaining, at a first unit, a first signal, and storing an indication of an arrival time of the first signal in a register of the first unit. The method also includes obtaining a digital signal to be provided to a controller area network (CAN) circuit system, the CAN circuit system being included in the first unit, adding the indication to the digital signal, wherein adding the indication to the digital signal creates an updated digital signal, and providing the updated digital signal to the CAN circuit system. The first unit may be a traction motor controller that includes a hardware circuit system and a digital signal processor, and the arrival time may be a timestamp.

In accordance with another embodiment, an apparatus includes a first unit, the first unit configured to provide a first signal; and a second unit, the second unit configured to obtain the first signal and to determine a timestamp based on the first signal. The second unit is further configured to obtain a second signal and to add the timestamp to the second signal to create an updated second signal, wherein the second unit provides the updated second signal to the first unit.

In accordance with yet another embodiment, a method includes obtaining, at a first unit, a first signal, the first signal being of an analog format. The method also includes converting, at a digital signal processor of the first unit, the first signal to a second signal the second signal having a digital format, and obtaining a timestamp associated with a time of arrival of a third signal at the first unit. Finally, the method includes creating an updated second signal, wherein the updated second signal includes the second signal and the timestamp, and wherein the updated second signal is provided to a controller area network (CAN) circuit system of the first unit.

DESCRIPTION

The ability for autonomous vehicles, e.g., autonomous delivery vehicles, to operate safely and reliably is critical. Within an autonomous vehicle, various systems operate together in a coordinated manner, and in some instances, latency may be introduced into communications between the various systems. Communications, as for example communications over a controller area network (CAN) bus, with an autonomous vehicle may introduce latency that may have a relatively significant affect on the timing accuracy of information and signals. Latency may have an adverse effect on the operations of an autonomous vehicle, as latency may cause timing issues and, as a result, have an impact on the accuracy with which systems of the autonomous vehicle may operate.

By adding a timestamp that may be used to determine when a particular signal is sent or received, timing information may essentially be provided for time synchronization purposes. The ability to perform time synchronization, as for example to mitigate the effects of latency associated with communications on a CAN bus, may improve the accuracy for system control and performance associated with an autonomous vehicle.

In one embodiment, a central control unit of an autonomous vehicle may send a time synchronization signal to a local control unit. A rising edge of the signal may be used to substantially reset a local counter, and a timestamp may incrementally increase as the local counter increments. The local control unit may collect information and signals including, but not limited to including, voltage information, current information, temperature information, rotary position sensor information, and/or wheel speed sensor information. The local control until may add a timestamp to the information and signals to substantially reflect timing information for the information and signals. The information and signals, with the added timestamp, may be sent by the local control unit to the central control unit through any suitable communication channel, e.g., a CAN bus. The inclusion of timestamps and, hence, timing information may effectively allow latency associated with signal transmission to be substantially avoided.

An autonomous vehicle which may include an ability to reduce effects of latency by facilitating time synchronization for information or signals transmitted from a local control unit to a central control unit may generally be part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
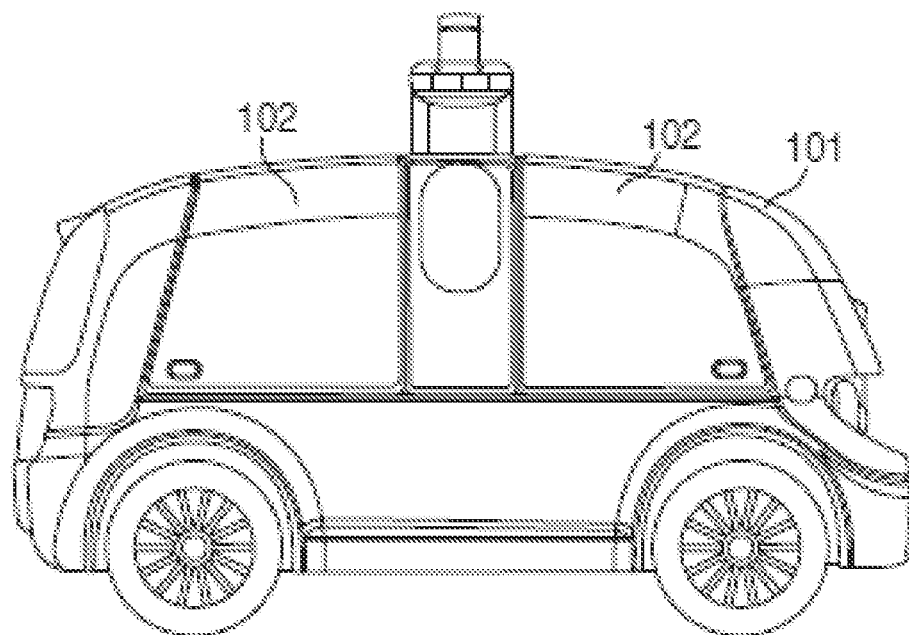
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
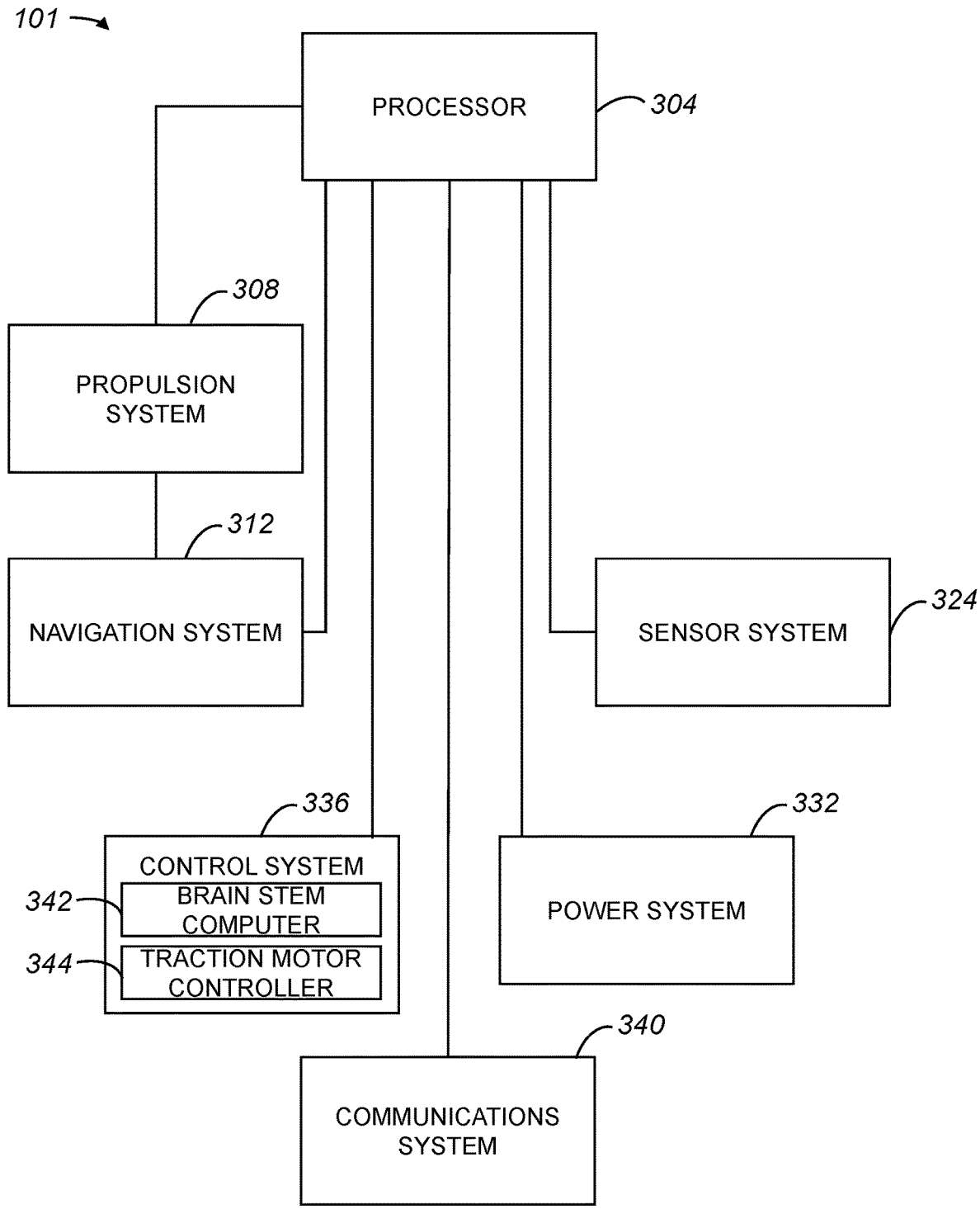
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine. In one embodiment, propulsion system 308 may include a traction motor.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As shown, control system 336 includes a brain stem computer (BSC) 342 and a traction motor controller (TMC) 344. In one embodiment, BSC 342 may be a central control unit of autonomous vehicle 101, and TMC 344 may be a substantially local control unit of autonomous vehicle 101. TMC 344 may generally control a motor included in vehicle 101. BSC 342, which may be a vehicle control unit (VCU) or domain controller, may generally be a supervisory controller which includes hardware and/or software which interfaces with other systems of autonomous vehicle 101 to facilitate the operation of autonomous vehicle 101. In general, BSC 342 may be arranged to determine actions to be taken by autonomous vehicle 101, and to effectuate the execution of the actions. For example, BSC 342 may process information provided by sensor system 324 and navigation system 312 to determine a location of autonomous vehicle 101, and cooperate with propulsion system 308 and navigation system 312 to cause autonomous vehicle 101 to navigate around detected obstacles. TMC 344, which may be a motor control unit (MCU), may be arranged to communicate with BSC 342 and with a rotary position sensor such as a resolver (not shown), as well as to generally provide motor control.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4:
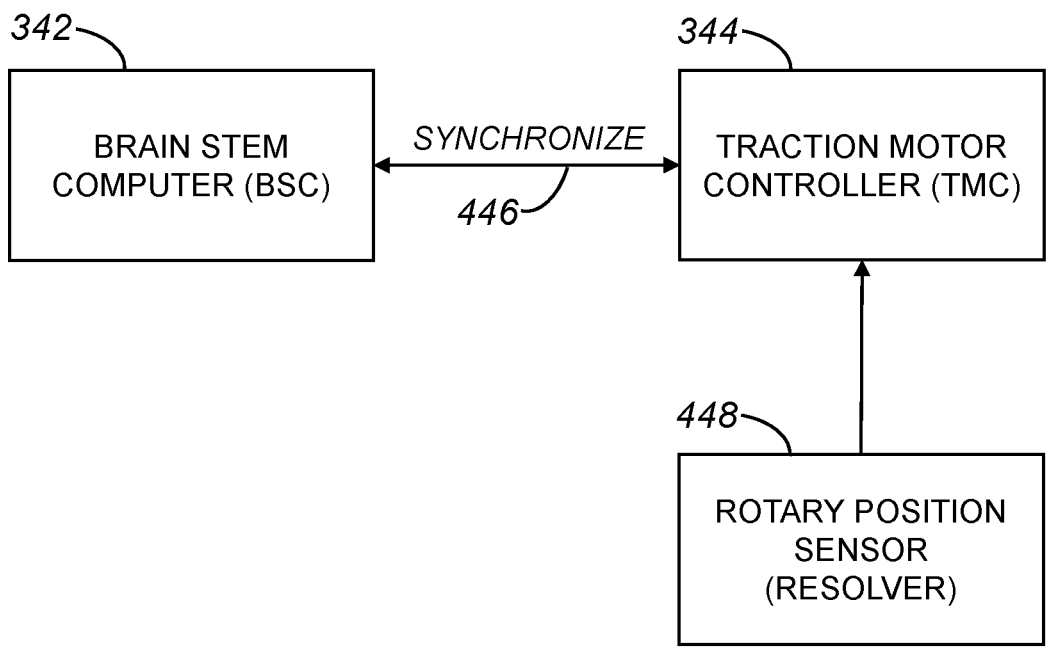
FIG. 4 is a block diagram representation of interactions between a brain stem computer (BSC), a traction motor controller (TMC), and a rotary position sensor, e.g., BSC 342 and TMC 344 of FIG. 3, in accordance with an embodiment.

BSC 342 and TMC 344 or, more generally, a central control unit and a local control unit, respectively, may interact such that TMC 344 provides information and signals to BSC 342 through a communication channel such as a CAN bus. FIG. 4 is a block diagram representation of interactions between BSC 342, TMC 344, and a sensor such as resolver in accordance with an embodiment. BSC 342 and TMC 344 generally communicate bi-directionally over one or more communication channels 446. For example, TMC 344 may obtain information from a sensor 448, e.g., a rotary position sensor such as a resolver, and provide that information to BSC 342 via a CAN bus. In order to enable BSC 342 and TMC 344 to operate substantially synchronously, TMC 344 may add synchronization information, e.g., a timestamp, to information provided to BSC 342. Rotary position sensor 448 generally obtains, or otherwise measures, data associated with a motor controlled by TMC 344. Rotary position sensor 448 may provide data which indicates a rotor position. That is, rotary position sensor 448 is an analog sensor such as an analog optical sensor configured to measure the angular position of a motor rotor. Data may be digitally sampled using chips such as resolver-to-digital chips. Such data may include an angle of rotation of a motor controlled by TMC 344.

Figure 5A:
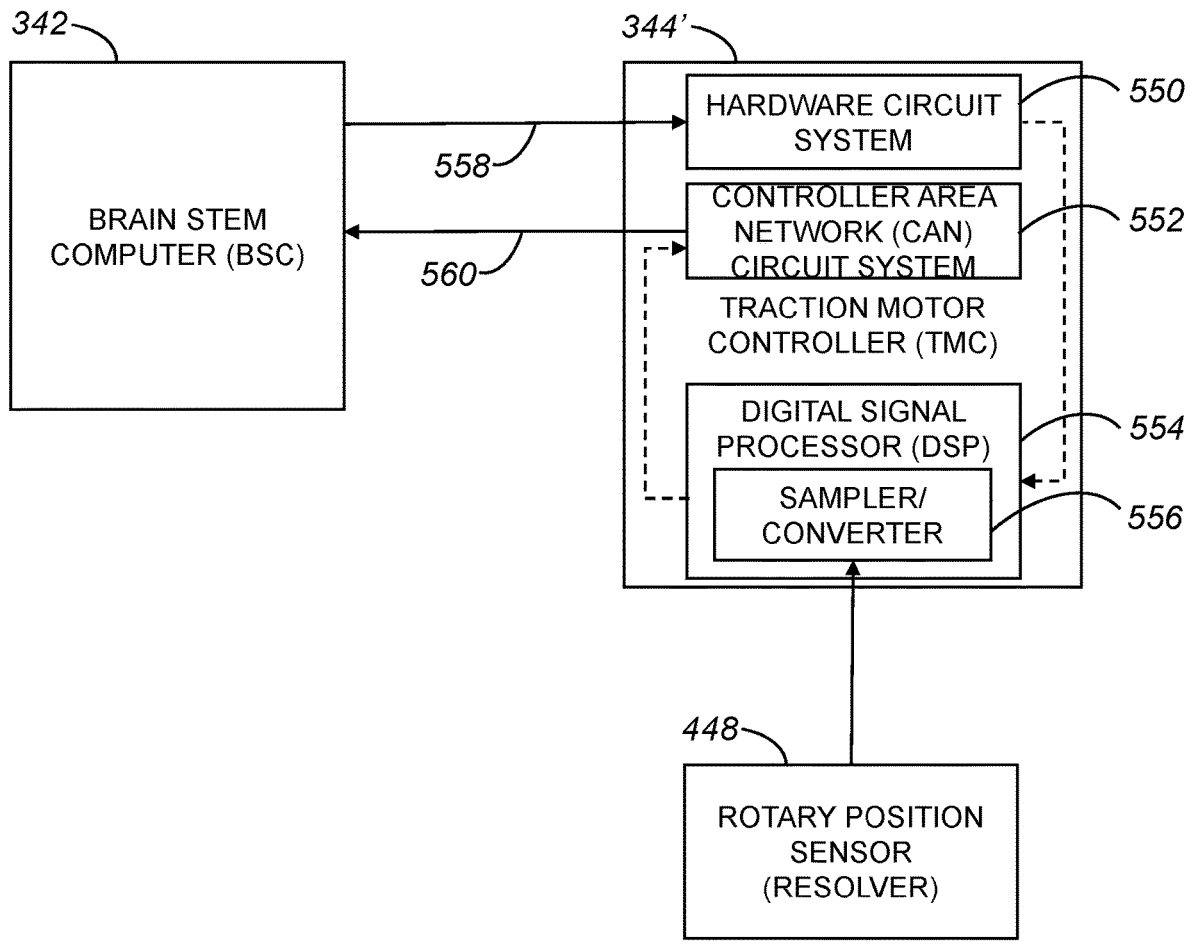
FIG. 5A is a block diagram representation of interactions associated with a TMC, e.g., TMC 344 of FIG. 3, in accordance with an embodiment.

TMC 344 typically includes systems or sub-systems which facilitate the addition of a timestamp to a signal or information provided to BSC 342. FIG. 5A is a block diagram representation of TMC 344, and interactions associated with TMC 344, in accordance with an embodiment. TMC 344', which is in communication with BSC 342 and rotary position sensor 448, is generally arranged to collect information from rotary position sensor 448 and to convert an analog signal obtained from rotary position sensor 448 to a digital signal to which a timestamp may be added. Once TMC 344' adds a timestamp to a digital signal, as for example a communication message such as a CAN message or an Ethernet message, associated with rotary position sensor 448, TMC 344' provides the digital signal and the timestamp to BSC 342. It should be appreciated that the digital signal may generally be a frame or a packet, and the timestamp may be added substantially anywhere in the frame of the packet. For example, a timestamp may be added to a predetermined location in a header or in a payload of a frame or a packet that is associated with a digital signal. The timestamp is generally a local counter associated with TMC 344',\. In one embodiment, a timestamp may be a counter that may be digitalized and stored in TMC 344'. A timestamp may be added as a digital field associated with a message protocol used for TMC 344' to BSC 342 communications. For example, in a CAN message, a timestamp may be used to populate one or more preassigned bits inside a data frame. A CAN data frame may contain up to approximately 64 bits of data, with a number of specific bits allocated for the timestamp, e.g., approximately sixteen bits, and a specific bits allocated for the signal being timestamped, e.g., approximately sixteen bits for a rotary position sensor.

BSC 342 may send a signal 558, e.g., a parts-per-second (PPS) signal, to a hardware circuit system 550 of TMC 344'. Signal 558 may be an approximately five-volt (V) differential 100 Hertz (Hz) signal, in one embodiment. Hardware circuit system 550 effectively provides signal 558 to a digital signal processor (DSP) unit 554. It should be appreciated that signal 558 may generally be a variable signal which may represent a number of parts-per-second. The number of parts-per-second may vary widely. For example, a PPS signal may represent one, fifty, one hundred, and/or five hundred parts-per-second. Generally, signal 558 is a synchronization signal or, more specifically, a timing synchronization signal. In one embodiment, a PPS signal is an example of a timing synchronization signal.

DSP unit 554 includes a sampler/converter 556 which is configured to obtain analog information or an analog signal from rotary position sensor 448, and to substantially convert the analog information or signal into digital information or a digital signal. In general, sampler/converter 556 samples information or a signal obtained from rotary position sensor 448, and performs an analog-to-digital (A/D) conversion. By way of example, an analog signal that represents a mechanical angle may be converted to a digital signal that represents an electrical angle. Using signal 558 obtained from BSC 342 through hardware circuit system 550, sampler/converter 556 adds a timestamp to the converted rotary position sensor signal.

CAN circuit system 552 of TMC 344' provides rotary position sensor information or a rotary position sensor signal 560 with a timestamp to BSC 342. In one embodiment, signal 560 may be provided to BSC 342 on a CAN bus, and the signal provided includes the timestamp.

While BSC 342 is providing signal 558 to hardware circuit system 440, rotary position sensor 448 may substantially simultaneously providing analog signals to sampler/converter 556. It should be understood that BSC 342 may generally provide signal 558 as part of a processing loop that is separate from a processing loop associated with rotary position sensor 448 providing analog signals. In other words, a timestamp may be provided by one processing loop such that the timestamp may effectively be used by another processing loop.

Figure 5B:
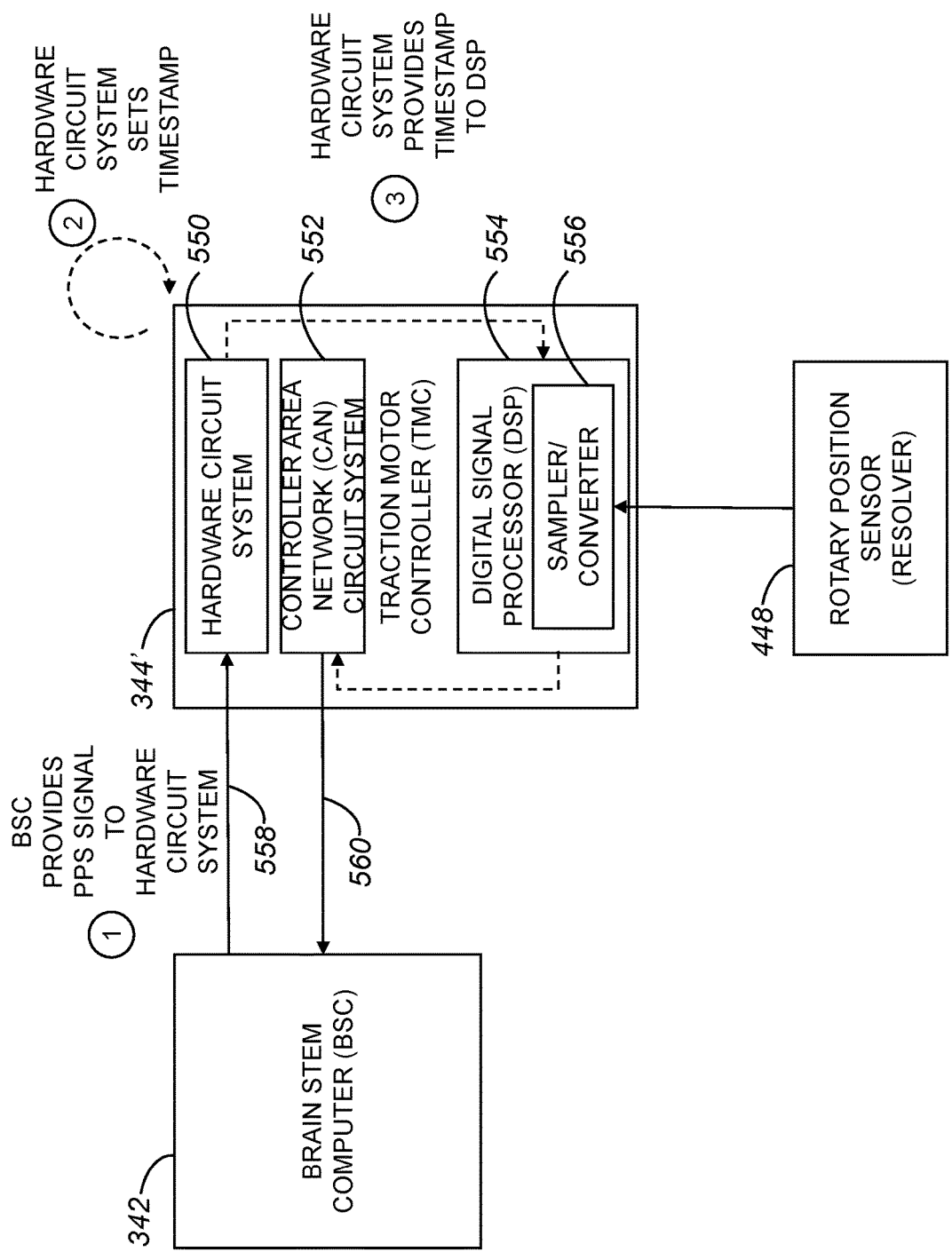
FIG. 5B is a block diagram representation of interactions associated with a TMC, e.g., TMC 344 of FIG. 5A, associated with providing a timestamp in accordance with an embodiment.

FIG. 5B is a block diagram representation of interactions associated with TMC 344 that are related to providing a timestamp in accordance with an embodiment. At a time t1, BSC 342 provides signal 558, e.g., a timing synchronization signal such as a PPS signal, to hardware circuit system 550. Upon receiving or otherwise obtaining signal 558, hardware circuit system 550 effectively sets a timestamp based on signal 558. Once the timestamp is effectively set, the timestamp may generally be accessed and used by TMC 344'. For example, at a time t3, hardware circuit system 440 may provide the timestamp to DSP 554.

Figure 5C:
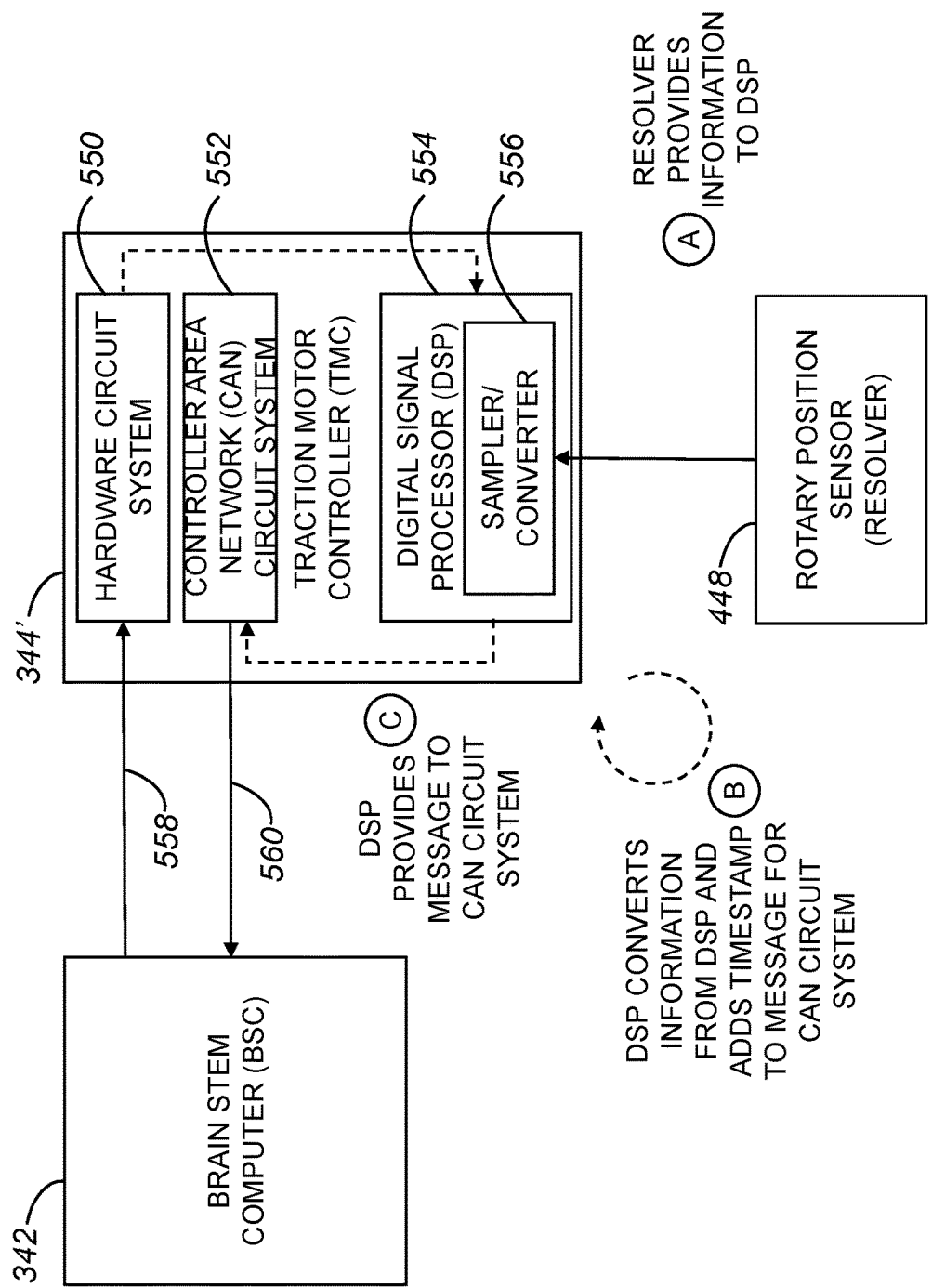
FIG. 5C is a block diagram representation of interactions associated with a TMC, e.g., TMC 344 of FIG. 5A, associated with utilizing a timestamp in accordance with an embodiment.

FIG. 5C is a block diagram representation of interactions associated with TMC 344 utilizing a timestamp in accordance with an embodiment. At a time tA, rotary position sensor 448 provides information, e.g., analog information, to TMC 344' or, more specifically, to DSP 554. At a time tB, DSP 554 uses sampler/convert 556 to convert the analog information into digital information, and adds a timestamp. Adding a timestamp may include, but is not limited to including, adding the timestamp at a predetermined location within a message to be provided to CAN system 552. At a time tC, DSP 554 provides the message, which includes a timestamp, to CAN circuit 552.

Figure 6:
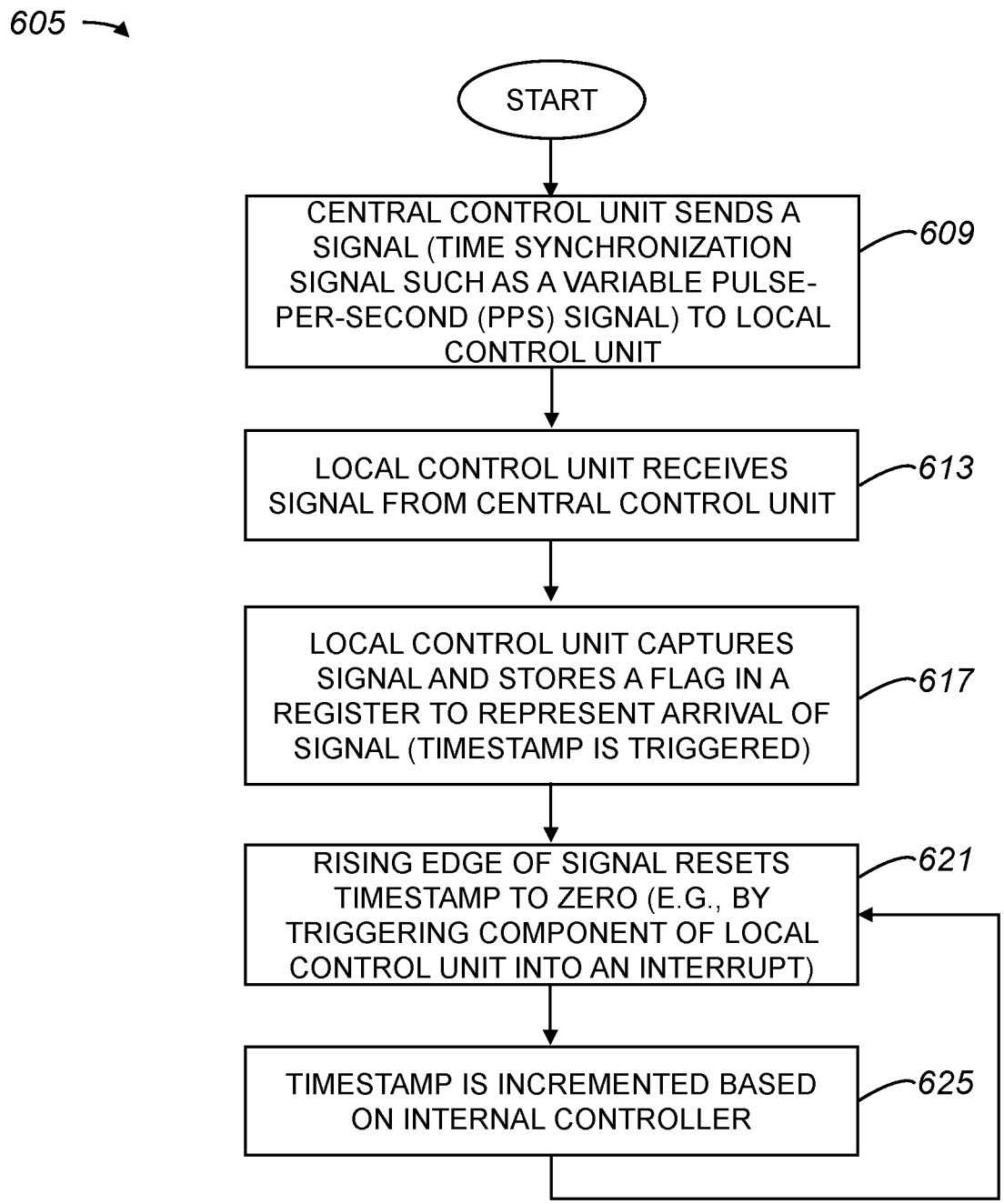
FIG. 6 is a process flow diagram which illustrates one method of providing information which may be used for time synchronization in accordance with an embodiment.

FIG. 6 is a process flow diagram which illustrates one method of providing information which may be used for time synchronization for autonomous vehicle systems that involves adding a timestamp based on a trigger in accordance with an embodiment. A method 605 of providing time synchronization information for use with autonomous vehicle systems begins at a step 609 in which a central control unit such as a BSC sends a signal to a local control unit such as a TMC. The signal may be a time synchronization signal such as a variable PPS signal that is sent specifically, in one embodiment, for the purpose of facilitating time synchronization.

The local control unit receives the signal from the central control unit in a step 613. Upon receiving the signal, the local control unit effectively captures the signal and stores a flag in a register to represent the arrival of the signal, thereby effectively triggering a timestamp in a step 617. In one embodiment, the register is in the local control unit, although it should be appreciated that the register may generally be in any suitable control unit. From step 617, process flow proceeds to a step 621 in which a rising edge of the signal resets the timestamp to zero. Resetting the timestamp to zero may involve triggering a component of the local control unit into an interrupt. Once the timestamp is reset to zero, the time stamp is incremented based on an internal controller, e.g., the central control unit, in a step 625. Then, process flow returns to step 621 in which a rising edge of the signal resets the timestamp to zero.

Figure 7:
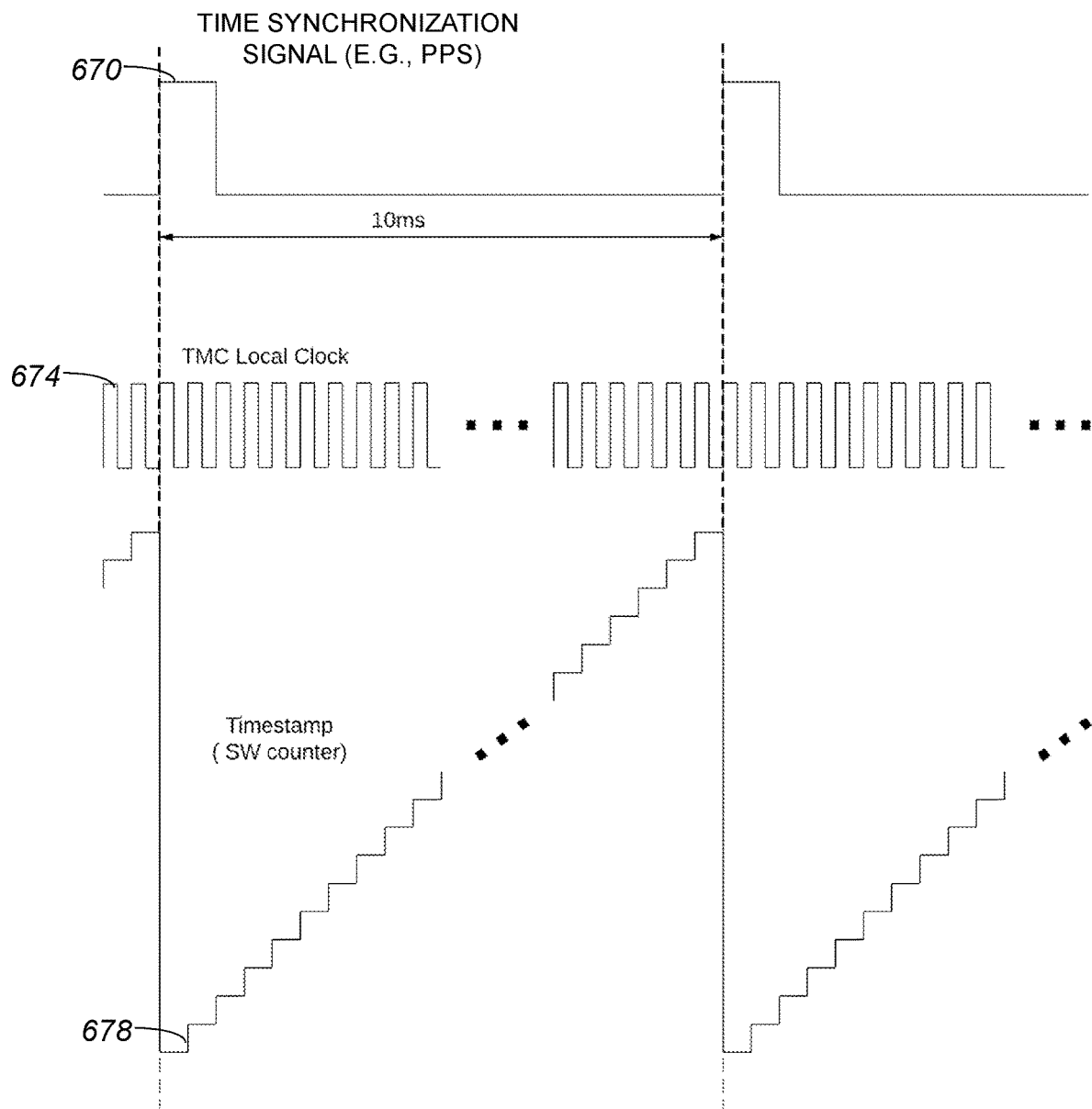
FIG. 7 is a diagrammatic representation of a timing diagram in accordance with an embodiment.

With reference to FIG. 7, a timing diagram associated with the method of FIG. 6 will be described in accordance with an embodiment. To substantially synchronize timing between a local control unit and an overall system, as for example a central control unit such as a BSC, the overall system may send a periodic signal 670 to the local control unit. The periodic signal may be a PPS signal. In one embodiment, the periodic signal may be an approximately 5V differential hardware signal with an approximately 100 Hz square pulse with an approximately ten percent high. A 100 Hz time synchronization signal such as a PPS signal may, in one embodiment, used substantially only for triggering timestamp measurements. Measurements may be used to ascertain how time relates between different embedded system clocks and to determine how much time has elapsed between signal pulses.

The local control unit, e.g., a TMC, may use a relatively high frequency local clock signal 674 to effectively implement a timestamp 678 using a DSP unit of the local control unit. The resolution of local clock signal 674 may be approximately ten nanoseconds (ns).

When signal 670 arrives at a local control unit, the DSP unit of the local control unit may capture signal 670 and store a flag in a register of the local control unit to represent the arrival of signal 670. A rising edge of signal 670 may effectively trigger a DSP unit into an interrupt, and to cause timestamp 678 to be reset to zero. In one embodiment, a priority of the interrupt may be higher than an interrupt service routine (ISR) in the DSP unit. The ISR may be set as approximately 10 kiloHz (kHz) per 100 microseconds (usec). The DSP unit may identify signal 670 by expecting only signal 670 to arrive at a specific electrical pin on an embedded system. Such a specific dedicated pin may generally be predetermined by the layout of the electrical system.

An interrupt may reset a timestamp to zero at the rising edge of a signal such as a PPS signal. A DSP unit or module of a TMC, for each ISR, may perform motor control and/or substantially produce IVT signals sensing work. The DSP unit may also sample rotary position sensor information, check a flag signal, capture the latest rotary position sensor information and to add a timestamp of the flag signal is set appropriately, and to send the rotary position sensor information and timestamp to the BSC via a CAN bus periodically, e.g., approximately every ten ms.

Figure 8A:
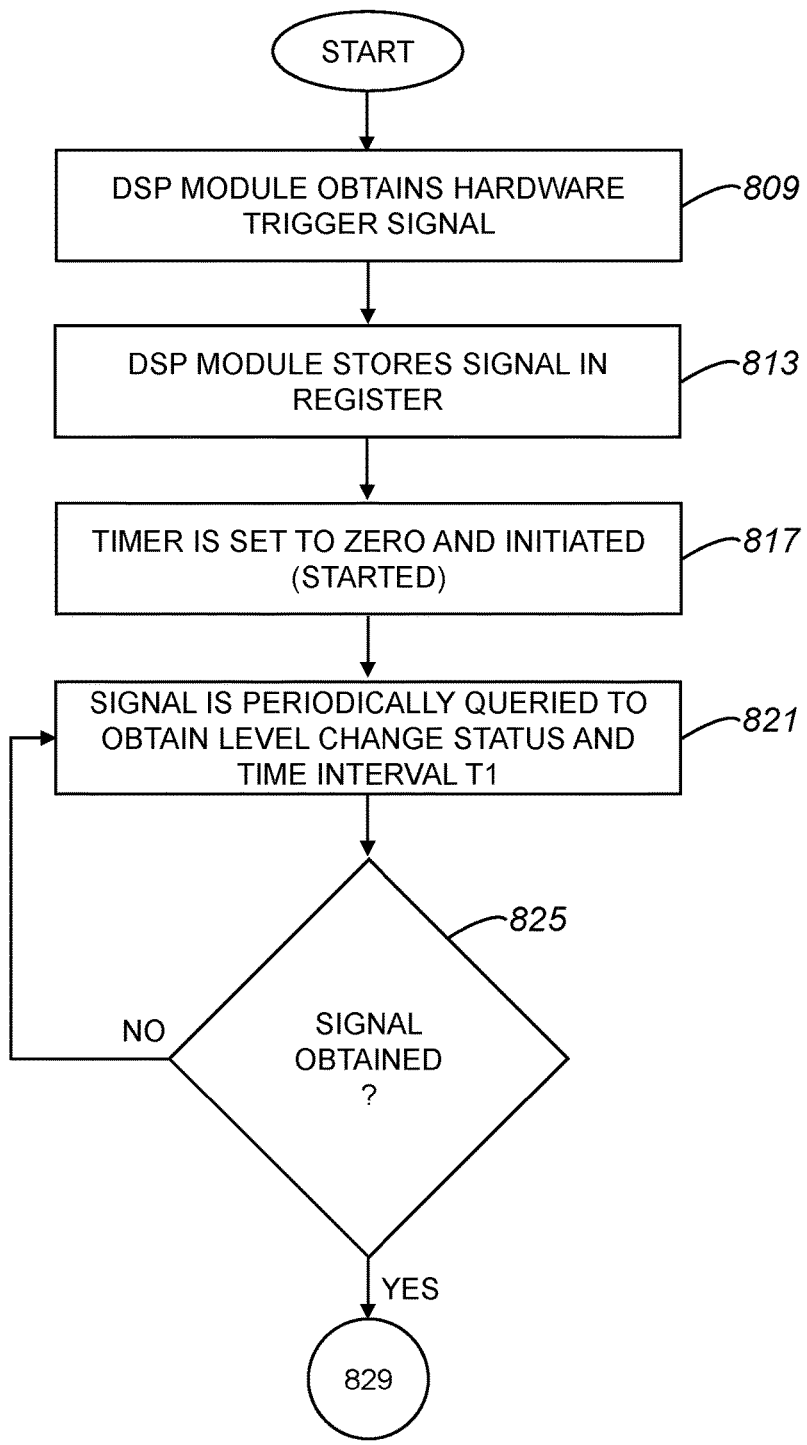
FIGS. 8A and 8B are a process flow diagram which illustrate s a method of processing a signal, e.g., a parts-per-second (PPS) signal, to create a timestamp in accordance with an embodiment.
Figure 8B:
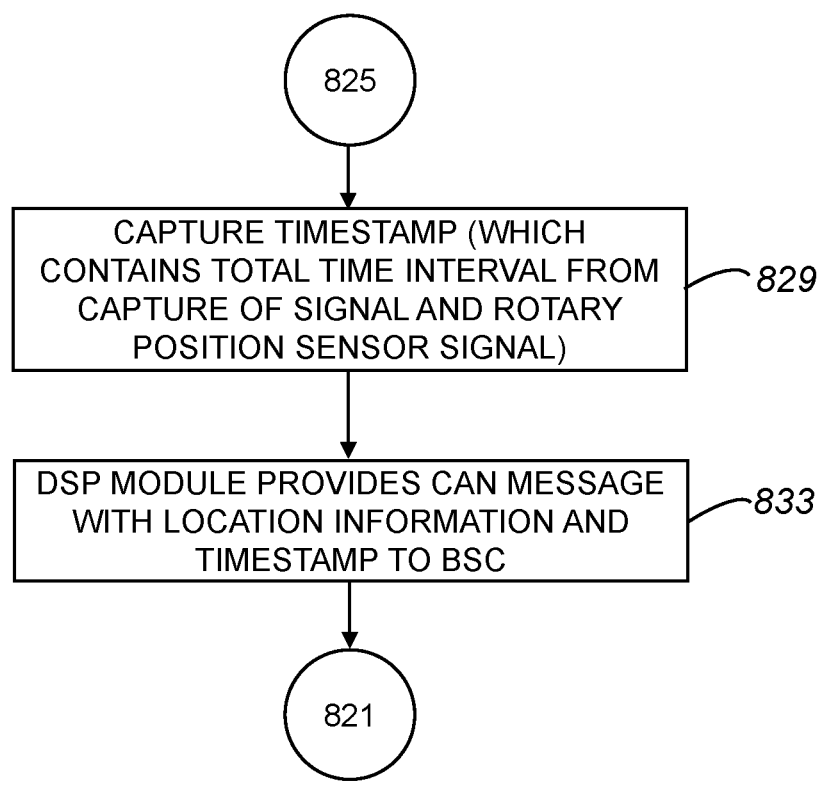

FIGS. 8A and 8B are a process flow diagram which illustrates a method of processing a signal, e.g., a PPS signal, to create a timestamp in accordance with an embodiment. A method 805 of processing a signal at a local control unit such as a TCM to create a timestamp begins at a step 809 in which a DSP unit or module of the TMC obtains a hardware trigger signal. The hardware trigger signal may be a PPS signal sent by, or otherwise provided by, a central control unit such as a BSC. Upon receiving or otherwise receiving the hardware trigger signal, the DSP module stores the signal in a register in a step 813.

In a step 817, a timer is set of zero and initiated, i.e., started, such that a timestamp may be obtained. A rotary position sensor signal is periodically queried to obtain a level change status and a time interval T1 in a step 821. Time interval T1 may be associated with an ISR.

A determination is made in a step 825 whether a signal has been obtained. If the determination is that a signal has not been obtained, process flow returns to step 821 in which the signal is periodically queried. Alternatively, if the determination in step 825 is that a signal has been obtained, a timestamp is capture in a step 829. The timestamp may be captured to include a total time interval from the capture of the signal. The rotary position sensor signal may also be captured, and may generally include a sending position angle.

In a step 833, the DSP module of the TCM provides a CAN message with location information and a timestamp to the BSC, Such information may be provided on any suitable communication channel such as a CAN bus. A CAN message may be sent periodically, as for example approximately every ten millisecond (ms). Once the CAN message is provided to the BSC, process flow returns to step 821 in which the signal is periodically queried.

Although only a few embodiments have been described in this disclosure, it should be understood that the disclosure may be embodied in many other specific forms without departing from the spirit or the scope of the present disclosure. By way of example, while adding timestamps or, more generally, information which may be used for time synchronization purposes, to a signal obtained from a rotary position sensor has been described, it should be appreciated that information which may be used for time synchronization purposes is not limited to being added to a signal obtained from a rotary position sensor such as a resolver. A timestamp may generally be added to any signal for which time synchronization information is useful.

Further, a timestamp or time synchronization information may be added using the methods described above to substantially any signal that is provided to a system of an autonomous vehicle. In other words, a timestamp is not limited to being added to a signal that is provided to a central control unit such as a BSC.

A BSC has been described as being a central control unit of an autonomous vehicle, and may be a VCU. It should be appreciated that a BSC generally coordinates the control and operation of components, e.g., safety-critical components, in an autonomous vehicle. For instance, a BSC may include microcontrollers which command driving system actuators, and may receive inputs or information from systems on an autonomous vehicle such as an autonomy system. In one embodiment, the BSC may effectively facilitate transitions between manual, autonomous, semi-autonomous, failover, and/or emergency modes of operation of an autonomous vehicle.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system of the autonomous vehicle, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:
    obtaining, at a first unit, a first signal;
    storing an indication of an arrival time of the first signal in a register of the first unit;
    obtaining a digital signal to be provided to a controller area network (CAN) circuit system, the CAN circuit system being included in the first unit;

adding the indication to the digital signal, wherein adding the indication to the digital signal creates an updated digital signal; and providing the updated digital signal to the CAN circuit system.

2. The method of claim 1 wherein the first unit is a traction motor controller, the traction motor controller further including a hardware circuit system and a digital signal processor, and wherein the arrival time is a timestamp.

3. The method of claim 2 wherein the first signal is a timing synchronization signal.

4. The method of claim 3 further including:
obtaining, at the digital signal processor, an analog signal, the analog signal being obtained from a rotary position sensor;
converting, using the digital signal processor, the analog signal into the digital signal.

5. The method of claim 4 wherein the first signal is obtained from a second unit, and wherein the updated digital signal is provided by the CAN circuit signal to the second unit.

6. The method of claim 5 wherein the first unit and the second unit are included in a control system of an autonomous vehicle.

7. The method of claim 3 wherein the digital signal processor captures the timing synchronization signal and stores the indication of the arrival time in the register, and wherein the timing synchronization signal includes a rising edge, the rising edge being arranged to trigger the digital signal processor to reset the timestamp.

8. An apparatus comprising:
a first unit, the first unit configured to provide a first signal; and
a second unit, the second unit including a hardware circuit system configured to obtain the first signal and a digital signal processor, the second unit configured to obtain the first signal and to determine a timestamp based on the first signal, the second unit further configured to obtain a second signal, the digital signal processor configured to add the timestamp to the second signal to create an updated second signal, wherein the second unit provides the updated second signal to the first unit.

9. The apparatus of claim 8 wherein the apparatus is a vehicle, the first unit is a vehicle control unit, and the second unit is a traction motor controller.

10. The apparatus of claim 9 wherein the first signal is a time synchronization signal.

11. The apparatus of claim 10 wherein the digital signal processor is configured to obtain a third signal from a rotary position sensor, the third signal being an analog signal, and wherein the digital signal processor converts the third signal into the second signal, the second signal being a digital signal.

12. The apparatus of claim 10 wherein the digital signal processor captures the time synchronization signal and stores an indication of an arrival time of the time synchronization signal in a register, wherein the arrival time triggers the timestamp.

13. The apparatus of claim 11 wherein the traction motor controller further includes a controller area network (CAN) circuit system, and wherein the digital signal processor provides the updated second signal to the CAN circuit system and the CAN circuit system provides the updated second signal to the vehicle control unit.

14. The apparatus of claim 8 further including:
a processor, wherein the second unit includes computer program code arranged to be executed by the processor to determine the timestamp based on the first signal and to add the timestamp to the second signal to create the updated second signal.

15. A method comprising:
obtaining, at a first unit, a first signal, the first signal being of an analog format;
converting, at a digital signal processor of the first unit, the first signal to a second signal the second signal having a digital format;
obtaining a timestamp, the timestamp being associated with a time of arrival of a third signal at the first unit; and
creating an updated second signal, wherein the updated second signal includes the second signal and the timestamp, and wherein the updated second signal is provided to a controller area network (CAN) circuit system of the first unit.

16. The method of claim 15 wherein the first unit is a motor controller, the motor controller including a hardware circuit system and a digital signal processor, the method further including:
obtaining the third signal, the third signal being obtained from a vehicle control unit, the third signal being a time synchronization signal, the time synchronization signal including a rising edge, the rising edge being arranged to trigger the digital signal processor to reset the timestamp.

17. The method of claim 16 further including:
providing the updated second signal from the CAN circuit system to the vehicle control unit.

18. The method of claim 15 wherein the first signal is obtained from a rotary position sensor.

19. The method of claim 15 wherein the first unit is included in an autonomous vehicle.

20. The apparatus of claim 12 wherein the time synchronization signal includes a rising edge, the rising edge being arranged to trigger the digital signal processor to reset the timestamp.

* * * * *